United States Patent
Deutsch

[11] Patent Number: 5,181,991
[45] Date of Patent: Jan. 26, 1993

[54] SOLAR WATER PURIFICATION DEVICE

[76] Inventor: David Deutsch, 1013 E. Bellevue Rd., Atwater, Calif. 95301

[21] Appl. No.: 714,599

[22] Filed: Jun. 13, 1991

[51] Int. Cl.$^5$ .......................... B01D 3/02; C02F 1/14
[52] U.S. Cl. .................... 202/176; 202/177; 202/180; 202/190; 202/234; 202/267.1; 202/267.2; 203/10; 203/25; 203/98; 203/DIG. 1; 203/DIG. 20; 203/DIG. 22
[58] Field of Search ............... 202/190, 192, 180, 234, 202/267.2, 267.1, 202, 185.1, 177, 176; 159/903; 203/DIG. 1, 10, 86, DIG. 20, DIG. 22, 98

[56] References Cited

U.S. PATENT DOCUMENTS

| 755,179 | 3/1904 | Smith | 202/190 |
|---|---|---|---|
| 1,359,276 | 11/1920 | Rushworth | 202/190 |
| 2,490,659 | 12/1949 | Snyder | 203/DIG. 1 |
| 3,190,816 | 6/1965 | Adamec | 203/DIG. 1 |
| 4,211,609 | 7/1980 | Diggs | 203/DIG. 1 |
| 4,211,613 | 7/1980 | Meckler | 203/DIG. 1 |
| 4,314,890 | 2/1982 | Beck et al. | 203/19 |
| 4,487,659 | 12/1984 | Stark | 203/25 |
| 4,525,242 | 6/1985 | Iida | 203/DIG. 1 |
| 5,053,110 | 10/1991 | Deutsch | 203/1 |

FOREIGN PATENT DOCUMENTS

| 60-220182 | 11/1985 | Japan | 203/DIG. 1 |
|---|---|---|---|
| 1484885 | 6/1989 | U.S.S.R. | 203/DIG. 1 |

Primary Examiner—Wilbur Bascomb, Jr.
Attorney, Agent, or Firm—Cornelius J. Husar

[57] ABSTRACT

The disclosure relates to an improved solar water purification apparatus. More specifically, it relates to a solar water purification apparatus that includes a first and second preheater, an evaporation load tank, condenser, and pure distillate collecting tank. The condensing surface is a domed upper structure which includes a corrugated inner surface to increase the condensing surface. The outer surface of the domed upper structure is likewise corrugated and completely enclosed by a first preheater chamber the permit efficient cooling of the domed upper structure and encourage rapid condensation, thus transferring heat from the interior corrugations to the exterior corrugations of the first preheater chamber, further adding to the overall thermal efficiency. After the load, which is any form of polluted water including seawater, is preheated in the first preheater chamber, it is directed to the an external solar operated preheater from which it is directed into the load evaporation tank within the domed upper structure where it evaporates and condenses on the internal corrugated surface of the domed upper structure and flows by gravity into a distillate collecting tank which is inverted mirror image of the domed upper structure. Back-up electrical heater units are provided for periods of cloudy days.

11 Claims, 2 Drawing Sheets

SOLAR WATER PURIFICATION DEVICE

RELATED APPLICATION

This application is related to applicant's copending application entitled Solar Water Purification Device, Ser. No. 07/596,317 filed Oct. 12, 1990, now U.S. Pat. No. 5,053,110 issued Oct. 1, 1991.

BACKGROUND OF THE INVENTION

Two very important issues facing the nations of today's modern world are, (1) a critical shortage of water in many geographical regions and (2) an unceasing and ever increasing concern for our environment. The present invention has been designed to help alleviate the concerns of many people as related to both of the above-noted universal concerns. More specifically, the subject invention is an improvement over the above noted copending application in which applicant has set forth an apparatus which will capture some of the sun's energy and utilize it to produce purified potable water. The load water which is utilized can be in the form of sea water, industrial wastewater, agricultural wastewater, sludge or any other form of contaminated liquid or semi-liquid which contains water.

The above noted earlier application utilizes the sun's energy to produce vaporization of the load within a domed structure wherein the vapors condense on the interior surface of the domed structure. After condensing, the condensate flows by gravity down the interior surface of the domed structure to a collecting tank where it is transferred to a storage tank or to the point of use. It can readily be seen that such a system would be well received since it makes a significant contribution toward alleviating the aforementioned problem relative to today's critical water shortage problem.

With respect to the second issue noted above, it can readily be seen that any apparatus which contributes to a reduction of the various types of polluted waters, industrial and agricultural wastewater which would normally end up in our rivers, lakes and streams would likewise be well received. If these various forms of polluted water were collected and transported to a plant utilizing the instant invention, there would be a dual benefit derived, i.e. there would be more pure water available to the communities and correspondingly, there would be an immediate reduction in the volume of polluted liquids, semi-liquids, or sludge available to pollute our streams, rivers and lakes, thus improving our environment significantly.

All of the above-noted problems and applicant's solar water purification device have been clearly set forth in the earlier noted application. However, the instant application is directed to ways of improving the efficiency of the condensation process within the domed upper structure and also increasing the amount of heat transferred to the load. (The term "load" as used hereinafter is intended to cover any and all forms of polluted wastewater such as agricultural, industrial or commercial wastewater, sewerage water, seawater, but not limited thereto). As also pointed out in the earlier application, residue by-products such as fertilizer derived from the load evaporation process are considered to be covered by the subject invention.

SUMMARY OF THE INVENTION

Accordingly, applicant's improved water purification apparatus provides a system which includes a domed upper structure which has an interior surface that includes corrugations which extend vertically from the circular base portion upwardly to the apex of the domed upper structure. The exterior surface of the domed upper structure is likewise provided with vertically extending corrugations. Both sets of corrugations provide a means whereby the surface area of the interior and exterior surfaces are significantly increased. Increasing the interior surface area dramatically increases the amount of surface area available for condensing vapors into droplets of purified water, while increasing the exterior surface area of the domed upper structure increases the heat transferred to a first preheater chamber and simultaneously lowers the temperature of the interior corrugated surface of the domed upper structure, thus increasing and improving the condensation process within the domed upper structure.

As an additional means of improving the condensation of vapors on the interior surface of the domed upper structure, the entire domed upper structure has been moved below ground. Other improvements in associated piping and a solar preheater have been introduced into the present system and will be discussed in greater detail below.

OBJECTS OF THE INVENTION

An object of the invention is the provision of a domed upper structure having an interior surface with improved condensation capabilities.

Another object of the invention is the provision of a domed upper structure having an exterior surface with increased heat transfer features.

A further object of the invention is the provision of a first preheater chamber which significantly reduces the temperature of the interior surface of the domed upper structure to increase the condensation thereon.

Yet another object of the invention is the provision of a first preheater chamber which completely encapsulates the domed upper structure.

Additional improvements of the solar collector and its relation to the remaining components are included herein.

These and other objects of the instant invention will now become more apparent hereinafter. The instant invention will now be described with particular reference to the accompanying drawings which form a part of this specification wherein like reference characters designate the corresponding parts in the several views.

DETAILED DESCRIPTION OF THE DRAWINGS

Figure 1:
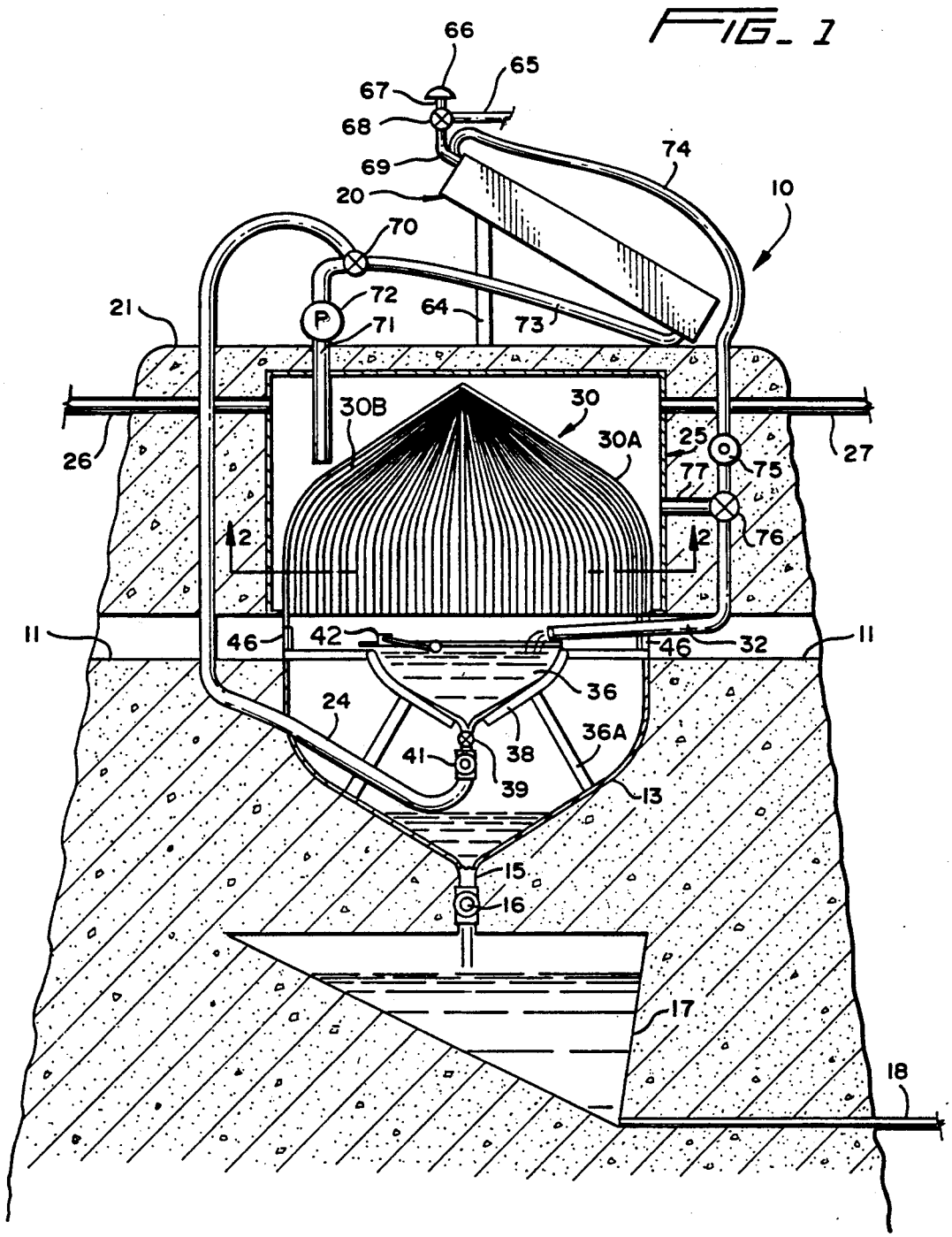
FIG. 1 is a vertical sectional view illustrating the overall configuration of the improved water purification apparatus.

Referring now to FIG. 1, there is shown a vertical sectional view of the improved solar water purification device generally indicated by reference numeral 10. As illustrated, the entire water purification device 10 is positioned below the earth's surface, except for second preheater 20 which is positioned on a level surface 21 of the earth which otherwise totally encompasses the improved solar water purification device 10. A tunnel or passageway 11 leads to the doors 46 to provide access into the interior of domed upper structure 30.

The improved device comprises a domed upper structure 30 which is surrounded by a first preheater chamber 25. On opposite sides of first preheater chamber 25 are a pair of load inlet conduits 26, and 27 which convey "load" from its place of storage (not shown) to first preheater chamber 25. Once first preheater chamber 25 has been filled with load, the load comes into direct contact with exterior corrugations 30A of domed upper structure 30, thus absorbing any heat which may have been imparted to inner corrugations 30B of domed structure 30 through contact with vapors which are produced by vaporizing load in load tank 36.

As illustrated, preheater chamber 25 which encapsulates domed upper structure 30 serves as a heat exchanger, absorbing heat from domed upper structure 30 and transferring it to the load within preheater chamber 25.

The structural lower half of the improved solar water purification apparatus 10 remains the same as set forth in my aforementioned co-pending application. Condensate collection tank 13 constitutes the lower half of the apparatus. As in my earlier application, condensate collecting tank 13 is a mirror image of domed upper structure 30, except for the outer and inner corrugations, 30A and 30B, respectively. Otherwise, the configuration remains the same. Each of the domed upper structure 30 and condensate collecting tank 13, starting at the vertical midpoint, are comprised of a first vertical portion, followed by an arcuate portion and then terminating in a converging straight portion. Collecting tank 13 is the same, except that it is an inverted configuration.

Load-recycle line 24 takes the cooler load which sinks to the bottom of load tank 36 to flow-control valve 70, which is a two-position valve, one position connects line 71 via pump 72 to second preheater 20, while the second position of flow control valve 70 connects recycle line 24 to line 73. With flow-control valve 70 and valve 39 in their proper position, and pump 41 energized, recycled load will be pumped from load tank 36 via line 24, through flow control valve 70 and then into conduit 73 and enter the bottom of second preheater 20 which is a solar operated preheater. The details of second preheater 20 will be discussed later in connection with FIG. 3. Suffice it to say, recycled load enters the bottom of second preheater 20, which is the coolest portion therein. As the load within second preheater 20 is exposed to the sun's rays, it absorbs the sun's heat and once the system is fully charged with load, the feeding of additional load into second preheater 20 will displace an equal amount of load therefrom and preheated load exits via conduit 74 which leads to sensor 75 and a second flow control valve 76, thence to load inlet conduit 32 which discharges into load tank 36 where the heated load evaporates. Operably connected to second flow control valve 76 is load discharge conduit 77. Second flow control valve 76 is a two position valve, the first position of which directly connects conduit 74 with conduit 32, with conduit 77 closed off. The other position of second flow control valve 76 closes off conduit 74 and interconnects conduit 77 with load inlet conduit 32. This second position, is the position which would be utilized when there is an extended period of cloudy overcast skies or whenever solar heat is not available for second preheater 20. In this situation, electrical heater elements 38 would be energized to provide the necessary heat for vaporization in load tank 36.

Sensor 75 senses the temperature of the load in line 74 coming from second solar preheater 20. When the outside solar/environmental conditions are not conducive to additional heating of load by solar preheater 20, sensor 75 activates two-way valve 76 and closes off load line 74 from solar preheater 20 and opens conduit 77 directly with load conduit 32, thus by-passing solar preheater 20. Load from first preheater 30 will now flow by gravity directly into load tank 36.

Also attached to the upper end of second preheater 20 is gas discharge line 69 which permits any gasses which collect in the uppermost portion of second preheater 20 to escape. A third two-position flow control valve 68 is located in gas discharge line 69. The first position connects gas discharge line 69 with atmosphere via conduit 67, cap 66 is provided to prevent moisture or rain from entering line 67 while allowing gasses to escape to atmosphere. The second position of third flow control valve 68 directly connects gas discharge line 69 with gas collecting line 65. This position would be used when the load that is processed contains gasses which are useful and desirable to be reclaimed. Line 65 leads to an appropriate storage tank (not shown). Support means such as vertical supports 64 are utilized to support second preheater 20 and maintain the proper angle relative to the sun's rays and optimize the amount of energy received from the sun.

Also shown in FIG. 1 is pump 72 which when energized, takes suction from first preheater chamber 25 via suction conduit 71 and with flow control valve 70 appropriately positioned, delivers load from first preheater 25 to second preheater 20 where the load picks up additional heat from the sun's rays prior to its delivery to load tank 36 where evaporation takes place. As shown, the lowermost end of conduit 71 extends into first preheater chamber 25 to ensure that load, which is close to outer corrugations 30A and has been preheated, will be withdrawn and directed to second preheater 20.

A review of the operation of the system shown in FIG. 1 is as follows. Fresh load (which can be any form of contaminated water) is pumped into the improved water purification apparatus via conduits 26 and 27. Level sensors (not shown) are located in first preheater 25 to maintain preheater 25 constantly full. Once the load has entered first preheater 25 it comes into contact with the outer corrugations 30A of domed upper structure 30. As can been seen, upper domed structure 30 will be heated by the vapors which have been produced within domed upper structure 30 and come into contact with inner corrugations 30B. In order for the vapors within domed upper structure to efficiently condense, the internal corrugated surface 30B of domed upper structure 30 must be kept as cool as possible. With domed upper structure 30 acting as a heat sink, the heat absorbed by contact with the vapors is transferred throughout the thickness of domed upper structure 30 to the outer corrugated surface 30A. Furthermore, inner corrugations 30B and outer corrugations 30A increase the total surface area available for condensing on the inside, and transferring heat to the load, on the outside thereof.

After preheating in first preheater 25, and assuming the load level in load tank 36 has dropped, a signal, as triggered by load tank level float sensor 42 energizes pump 72 thus withdrawing preheated load from first preheater 25 and directing it to second preheater 20 via conduit 73. With fresh preheated load entering the bottom of second preheater 20 an equal amount of load is displaced from second preheater 20 and exits via line 74, through second flow-control valve 76 into conduit 32 and then discharges into load tank 36.

Once the preheated load has entered load tank 36, evaporation will take place due to the heat imparted to the load in the first and second preheaters, 25 and 20, respectively. As evaporation occurs, vapors will begin to rise from the top surface of the load in the load tank 36 until they come into contact with inner corrugations 30B at which time they will condense thereon. Small droplets of condensation will first appear and gradually these droplets will become larger droplets of condensate at which time they will begin to flow by gravity down the interior corrugated surface 30B of domed upper structure 30. As pointed out in my earlier application, except for the corrugations, the design of the domed upper structure 30 is such that the uppermost portion is a smoothly corrugated diverging straight portion, allowing the condensate droplets to travel down the surface thereof. This first corrugated straight portion is followed by a smooth corrugated arcuate portion which is then followed by a second straight smoothly corrugated portion where it smoothly connects with a first smooth straight portion, without corrugations, of condensate collecting tank 13. A second curved portion connects with the last mentioned smooth straight portion which is followed by another straight converging portion which terminates in condensate tank outlet 15. This smooth flow path permits uninterrupted flow of the condensate as it travels downward. It is to be noted that the internal and external surfaces of collecting tank 13 do not have the corrugations as provided for domed upper structure 30.

The purpose of this particular design for the domed upper structure 30 is to ensure that once the larger droplets of condensate have formed on the interior surface 30B they will flow by gravity down the corrugated surface thereof and not drop back into the load tank 36 or onto the surrounding walkway. This unique design significantly contributes to the overall efficiency of the system.

Disposed immediately below condensate tank outlet 15 is turbo-generator 16 which can be used for co-generating electricity as condensate flows from within condensate tank 13 into condensate storage tank 17. Condensate storage tank 17 has a shape which will provide maximum outlet pressure in discharge line 18, thus eliminating the need for motor driven pumps.

Figure 2:
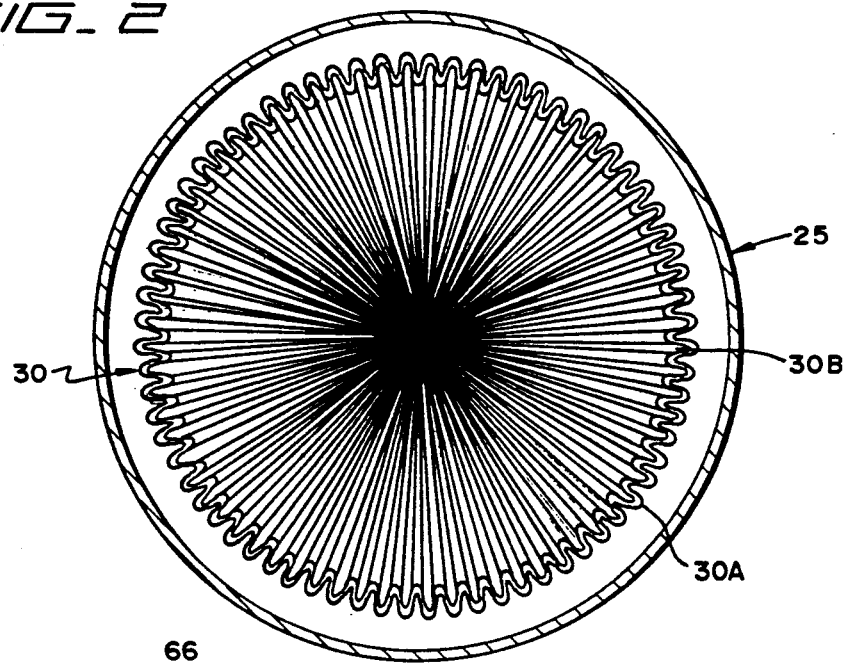
FIG. 2 is a sectional view taken along the plane 2—2 of FIG. 1 illustrating the corrugations of the domed upper structure.

Referring now to FIG. 2, there is shown a sectional view of domed upper structure 30 looking up into the apex thereof. Outermost cross-hatched circle is the wall of first preheater chamber 25. Corrugations 30A and 30B are clearly illustrated in this figure.

Figure 3:
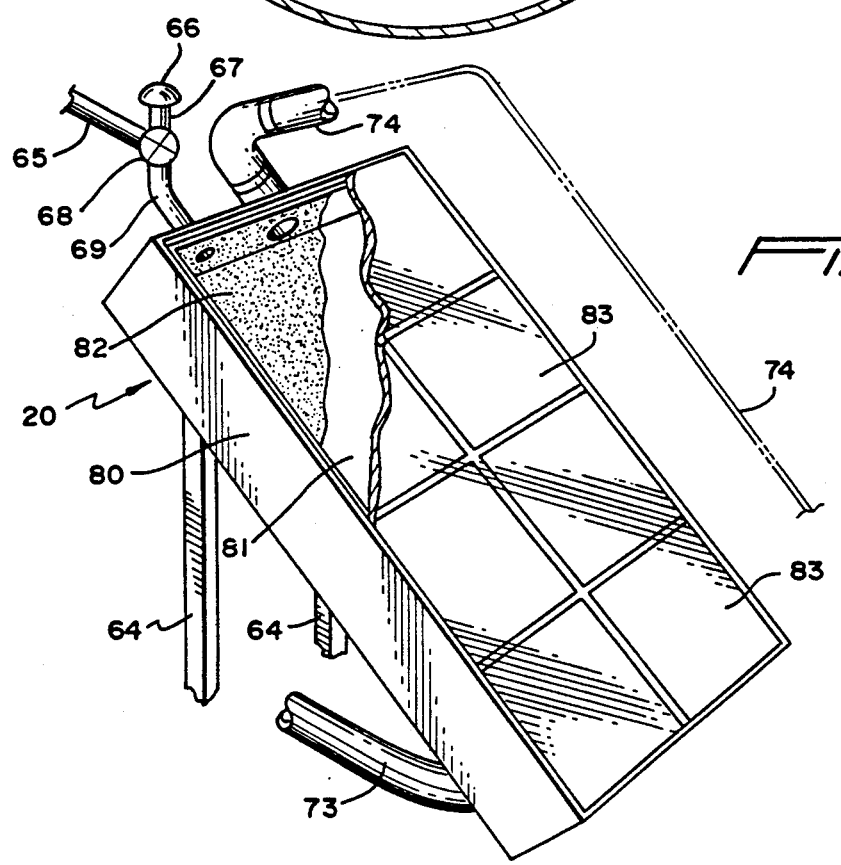
FIG. 3 is an enlarged view of the solar preheater per se, which is illustrated in FIG. 1.

FIG. 3 is an enlarged illustration of second preheater 20 which is a solar collecting unit. As illustrated, second preheater 20 comprises a rectangular frame 80 having two pairs of oppositely disposed sides and a black painted floor or base 81. Inlet for load line 73 is obscured in this view. Base 81 is first painted black to increase its heat absorbing properties and have it act as a "black body". An infra-red absorbing polymer 82 is applied over the black painted area 81 to further increase its heat absorbing properties. All four sides of frame 80 are treated in like manner to maximize the amount of heat absorbed by the load. The top of frame 80 is enclosed with a plurality of clear break-resistant plastic panels 83. By using a plurality of panels 83, the cost of panel replacement would be considerably less than if the entire glass unit were to be replaced due to breakage.

Extending from the uppermost portion of frame 80 is gas discharge line 69 that is provided with a two-position valve 68. One position of valve 68 interconnects gas discharge line 69 with vent line 67 to atmosphere. Cap 65 is provided to prevent rain or other elements from entering the system while permitting gasses to excape. The second position of valve 68 interconnects gas discharge line 69 with line 65 for collection of the gasses and recycling them. Line 74 also extends from the uppermost portion of frame 80 and is provided to direct preheated load to the load tank 36 where evaporation takes place within domed upper structure 30. The overall dimensions of first preheater 30 and second preheater 20 is in the range of several hundred feet in diameter and although only a single preheater 20 is illustrated, there may be multiple units, each of which consisting of thousands of square feet of solar panel area sufficient to handle the requirements of preheating for load tank 36.

While the invention has been described in its preferred embodiment, it is to be understood that the words which have been used are words of description rather than limitation and changes may be made within the purview of the appended claims without departing from the full scope or spirit of the invention.

Having thus described my invention, I claim:

1. A solar water purification system comprising a domed upper structure and a distillate collecting tank means positioned below said domed upper structure; said domed upper structure operatively connected to said distillate collecting tank means at a horizontal midpoint to provide an interior for said water purification system; load tank means operably positioned in said distillate collecting means; a first preheater means encapsulating said domed upper structure; load supply means supplying fresh load to said first preheater means, and distillate storage means positioned below said distillate collecting means for receiving purified distillate therefrom; all of said aforementioned structure positioned below the earth's surface to enhance the condensation of vapors within said domed upper structure; access means for providing access to said interior of said water purification system; said load supply means including conduit transfer means interconnecting said first preheater means and said load tank means; second solar preheater means including conduit and control means for selectively receiving load from either said first preheater means or from said load tank means for further increasing the temperature of said load prior to its discharge into said load tank means whereby preheated load evaporates therein, rises as vapors and condenses upon the interior surface of said domed upper structure and smoothly flows by gravity down said interior surface into said distillate collecting tank means.

2. A solar water purification system of the character defined in claim 1 wherein said domed upper structure comprises an enclosure for said load tank means and said distillate collecting means; said enclosure formed by a first portion having a plurality of internal and external corrugations which extend vertically from said horizontal midpoint of connection with said distillate collecting means; said vertical corrugations extending into a second arcuate portion followed by a straight portion which converges and terminates at the apex of said domed upper structure, whereby said internal and external corrugations effectively increases the total surface area available for efficient condensation of vapors which have collected therein while simultaneously increasing the surface area for transferring heat to said load within said first preheater means.

3. A solar water purification system of the character defined in claim 2 wherein said first preheater means comprises a chamber formed by a circular vertical wall portion and an upper horizontal wall; said circular vertical wall portion has a base dimension larger than the outer dimension of said domed upper structure and a height greater than the height of said domed upper structure; said load supply means delivering load to the interior of said chamber whereby said load comes into direct contact with said external corrugations of said domed upper structure and accelerates the transfer of heat from said enclosure of said domed upper structure reducing its interior temperature and increasing the condensation of vapors thereon.

4. A solar water purification system of the character defined in claim 1 wherein said distillate collecting tank means is an inverted mirror-image structure of said domed upper structure with said distillate collecting means including support means for centrally positioning said load tank means in said distillate collecting tank means.

5. A solar water purification system of the character defined in claim 1 wherein said load tank means comprises a vessel having an open upper portion and sides that extend downwardly and converge to form a valve controlled outlet.

6. A solar water purification system of the character defined in claim 5 wherein said load tank means further includes auxiliary load heater units which consist of a plurality of electrical heaters positioned immediately adjacent to the converging outer surface of said load tank whereby said electrical heater units can be energized to supply heat to the load in said load tank when said first and second preheaters are insufficient to produce evaporation of the load in said load tank.

7. A solar water purification system of the character defined in claim 5 wherein said load tank means includes load transfer means which conveys cooler load from the bottom of said load tank means to said second preheater means whereby said load absorbs additional heat from the sun prior to its return to said load tank for evaporation.

8. A solar water purification system of the character defined in claim 1 wherein said second solar preheater means comprises solar panel means inclined to receive the sun's rays; said solar panel means comprises a solar collector constructed to include a bottom portion and upwardly extending wall portions forming a receptacle; said bottom portion and upwardly extending wall portions first painted black to absorb the sun's rays and subsequently coated with a layer of an infra-red absorbing polymer to further increase the heat absorbed from the sun; said solar collector provided with a clear break-resistant plastic cover which is sealingly received in said upwardly extending wall portions to provide an enclosure for said load therein; conduit means for supplying load to said solar collector and additional conduit means leading from said solar collector back to said load tank means after said load has absorbed additional heat.

9. A solar water purification system of the character defined in claim 8 wherein said solar panel means further includes vent means extending through one of said upwardly extending wall portions at the uppermost end of said inclined solar collector; said vent means including a conduit which communicates with the interior of said solar collector; said last mentioned conduit provided with a two-way valve which allows the collection of reclaimable gasses vented from said solar collector in one position and allows non-reclaimable gasses to escape to the atmosphere in the second position thereof.

10. A solar water purification system of the character defined in claim 8 wherein said first preheater means further includes a by-pass conduit means which interconnects with said additional conduit means that leads from said solar collector back to said load tank whereby said second solar preheater may be by-passed allowing preheated load to flow directly from said first preheater chamber to said load tank means within said domed upper structure.

11. A solar water purification system of the character defined in claim 10 wherein said by-pass conduit means includes a two-way valve wherein a second position of said valve closes said by-pass conduit relative to said load supply means and said load supply means is connected to said additional conduit means leading from said second preheater means.

* * * * *